United States Patent [19]

Grangeon et al.

[11] Patent Number: 5,607,586
[45] Date of Patent: Mar. 4, 1997

[54] MULTICHANNEL INORGANIC ELEMENT FOR FILTERING A FLUID

[75] Inventors: André Grangeon; Philippe Lescoche, both of Nyons, France

[73] Assignee: T.A.M.I. Industries, France

[21] Appl. No.: 488,785

[22] Filed: Jun. 8, 1995

[30] Foreign Application Priority Data

Jun. 8, 1994 [FR] France .................. 94 07206

[51] Int. Cl.$^6$ .................................. B01D 63/06
[52] U.S. Cl. ................... 210/321.78; 210/321.87; 210/323.1; 210/323.2; 210/433.1; 210/510.1; 96/4; 96/9
[58] Field of Search .............. 210/323.1, 323.2, 210/321.78, 321.87, 433.1, 510.1; 96/4, 9

[56] References Cited

U.S. PATENT DOCUMENTS 4,222,874 9/1980 Connelly ................ 210/323.2
4,233,351 11/1980 Okumura et al. .
5,403,480 4/1995 Sugimoto ................ 210/510.1

FOREIGN PATENT DOCUMENTS

WO93/07959 4/1993 WIPO .

OTHER PUBLICATIONS

H. P. Hsieh, R. R. "Microporous Alumina Membranes", Bhave and H. L. Fleming, *Journal of Membrane Science*, 39 (1988) 221–241.

*Primary Examiner*—W. L. Walker
*Attorney, Agent, or Firm*—Bacon & Thomas

[57] ABSTRACT

The invention relates to an inorganic element for filtering a fluid medium, in order to recover a filtrate. According to the invention, the inorganic filter element includes:

radial partitions of constant thickness over their entire height, with a ratio of partition height over partition thickness being not greater than 8; and
  connection fillets of radius lying in the range 0.3 mm to 1.5 mm.

9 Claims, 2 Drawing Sheets

MULTICHANNEL INORGANIC ELEMENT FOR FILTERING A FLUID

FIELD OF THE INVENTION

The present invention relates to the technical field of separating out molecules or particles by using separator elements, generally referred to as "membranes", and constituted from inorganic materials.

More precisely, the invention relates to making an inorganic filter element that is generally tubular in shape, enabling molecular or particular species contained in a fluid medium that exerts a given pressure on the membranes to be concentrated, sorted, or extracted.

A particularly advantageous application of the invention lies in the field of nanofiltration, ultrafiltration, microfiltration, filtration, or reverse osmosis.

BACKGROUND OF THE INVENTION

In the field of filter elements that are tubular in shape, each membrane is constituted by a porous support made in the form of a tube whose inside surface is provided with at least one separating layer of nature and morphology that are adapted to separate molecules or particles contained in the liquid medium circulating inside the tube. By a sieve effect, such a membrane separates molecular or particular species from the substance to be treated insofar as all of the molecules or particles that are larger than the pore diameter of the membrane are stopped. The membrane thus subdivides the inlet volume into a first volume called the "filtrate" or the "permeate" and containing the molecules or particles that have passed through the membrane, and a second volume that contains the molecules or particles retained by the membrane.

Separation of molecular or particular species is mainly characterized firstly by stop size, i.e. the smallest molecule or particle that is totally stopped by the membrane, and secondly by the transit speed at which the separation is performed. The transit speed through the membrane depends on texture characteristics of the layer (pore diameter, porosity) and also on its thickness. To be effective, a membrane must have high transit speed and consequently small thickness. The function of the support is to provide mechanical strength enabling layers to be made that are very thin. The support also needs to possess the characteristic of very low hydraulic resistance so that the transit speed through its pores does not give rise to significant head loss, since that would reduce the efficiency of the membrane. Thus, the support must be capable of providing the membrane with mechanical strength while the separating layer must define permeability without participating in mechanical strength.

Numerous membranes made on the basis of tubular filter elements are known in the state of the art. Thus, it is known to mount tubular elements in parallel inside a case referred to as "module". In conventional manner, modules are characterized by the ratio of the total exchange area of the membranes divided by the volume of the module. Naturally, the idea is to provide modules for which the value of this ratio is as high as possible. To increase the ratio, it is clear that it is appropriate to reduce the outside and inside diameters of the tubes. However, it should be considered that inorganic membranes possess the characteristic of being fragile, such that it appears to be impossible in an industrial context to make use of small diameter tubes.

To increase the ratio while avoiding the problem of fragility, a novel type filter element has been developed that has multiple channels. As can be seen in FIG. 1, this inorganic filter element 1 comprises a rigid porous support 2 of elongate shape having a right cross-section that is polygonal or, as illustrated, circular. The porous support 2 which is made of a ceramic, for example, is formed to include a series of channels 3 parallel to the longitudinal central axis A of the support 2. The surface of each channel 3 is covered in at least one separation layer that is intended to come into contact with the medium to be separated. The exchange area of a multichannel filter element is much greater than that of a tube, thereby making it possible to increase the ratio of exchange area over volume.

However, it turns out that the multichannel element suffers from a major drawback. During separation, fluid transfer takes place through the layer(s) and then the fluid spreads out in the pores of the support so as to reach the outside surface 4 of the support. As can be seen clearly in FIG. 1, the path that the filtrate must follow before reaching the outside surface 4 of the support is much longer for the channel(s) situated in the central portion of the support than it is for the other channels, in particular the peripheral channels. Furthermore, filtrates coming from the channels in the central region of the support encounter the filtrates coming from the other channels. That is why head loss appears for transfer of filtrate to the outside surface of the support. This head loss opposes transfer pressure and reduces transit speed. It should also be observed that head loss exists, to a lesser degree, for the other channels. Because of the observed head loss, the transit speed of a multichannel element having n channels is less than that which would be provided by a collection of n tubular elements having the same inside diameter as the channels, and that reduces the advantage of increasing the ratio of exchange area over volume.

In the state of the art, another kind of multichannel type tubular filter element is known from patent application WO 93/07 959. In a first embodiment, the filter element has an inorganic porous support in which channels are provided parallel to the central axis of the support with their centers being situated on a circle that is coaxial about the central axis. In right cross-section, each channel has a peripheral wall directed towards the outside surface and co-operating therewith to define a passage of constant thickness through which the filtrate passes. Each peripheral wall is extended on either side by interconnected radial walls each defining a partition in co-operation with the facing radial wall of an adjacent channel. The channel profile is selected so as to leave partitions that flare in a wedge shape towards the outside of the substrate. In a second embodiment, the axes of the channels are situated either on a plurality of coaxial circles about the axis of the support, or else in layers that are parallel to one another and to the axis of the porous support. In that second embodiment, adjacent channels between the two series leave a partition that also flares towards the outside of the substrate. It thus appears that the wedge shape facilitates transfer of the permeate towards the outside surface of the support.

Although the second embodiment facilitates transfer of the permeate, it must be observed that that configuration does not provide a solution to the problem of loss of permeability.

However, the Applicant has shown that the first configuration does make it possible to reduce head loss for permeate transfer, so that permeability can be obtained that is very close to that of tubular elements having the same inside diameter as the channels. In that disposition, the passages along which the filtrate passes are of constant thickness and carry fluid coming solely from the corresponding peripheral walls of the channels. The transfer of filtrate coming from the radial walls takes place via the pores of the partitions, and the constantly varying thickness of said partitions enables the filtrate to be evacuated without head losses appearing to oppose the transfer pressure.

Nevertheless, this first type of configuration for a filter element suffers from drawbacks.

The partitions that remain between the channels are of increasing thickness such that the ratio between the thickest portion and the thinnest portion is no more than three. It turns out that this variation in partition thickness prevents layers being deposited that are uniform. The available pore volume increases continuously, with the consequence that the thickness of a deposit increases going from the thinnest portion towards the thickest portion. Although this matters little for microfiltration layers, such variation in thickness gives rise to faults due to excess thickness in ultrafiltration layers and is completely unacceptable for nanofiltration layers.

Also, in a variant embodiment, the text of that document provides for the variation in partition thickness to appear beyond one-half the total height of the partition. That configuration is even worse for uniformity of deposits, since it gives rise to a sudden change therein. This gives rise to cracks appearing because of tension during the shrinkage that is caused by drying.

Another drawback is associated with the fact that said prior solution provides for connection fillets between the radial and peripheral walls, said fillets presenting sharp angles. It has been observed, that under such conditions meniscuses form in the connection zones while the deposition solution is being emptied out. Such liquid meniscuses give rise to localized accumulation of the deposited suspension, and that is a major source of defects because of the large variation in deposit thickness that is caused thereby.

OBJECT AND SUMMARY OF THE INVENTION

The object of the invention is thus to remedy the drawbacks specified above, by proposing a multichannel inorganic fluid filter element that is adapted to minimize head loss during permeate transfer and that is designed to enable separating layers to be deposited that are of regular thickness over the entire surface of the filter channels.

To achieve this object, the inorganic filter element for filtering a fluid medium in order to recover a filtrate is of the type comprising:

a rigid inorganic porous support of cylindrical shape having a longitudinal central axis; and channels formed in the support, parallel to its central axis, and having centers situated on a circle that is coaxial about the central axis, each channel presenting:
  a surface that is covered in at least one separating layer designed to come into contact with the fluid medium; and
  firstly at least one peripheral wall facing the outside surface of the support and co-operating therewith to define a passage of constant thickness through which the filtrate passes, and secondly, at least one radial wall co-operating with the facing radial wall of an adjacent channel to define a partition, the walls of the channel being connected to one another via connection fillets.

In the inorganic filter element of the invention,
  each radial partition is of constant thickness over its entire height, with a ratio of the height of a partition divided by its thickness being not less than 8; and
  the connection fillets have a radius lying in the range 0.3 mm to 1.5 mm.

The filter element of the invention provides the advantage of not presenting defects in the deposited separating layers, in particular because of the constant thickness of the partition and because of the way in which the connection fillets are dimensioned, while nevertheless making it possible to provide good evacuation of the filtrate. In addition, the invention makes it possible to obtain a filter element that presents a transit speed that is substantially the same as that which corresponds to a collection of tubular elements having an inside diameter equal to the section of the channels.

BRIEF DESCRIPTION OF THE DRAWINGS

Various other characteristics appear from the following description made with reference to the accompanying drawings which show embodiments and implementations of the invention by way of non-limiting example.

MORE DETAILED DESCRIPTION

Figure 2:
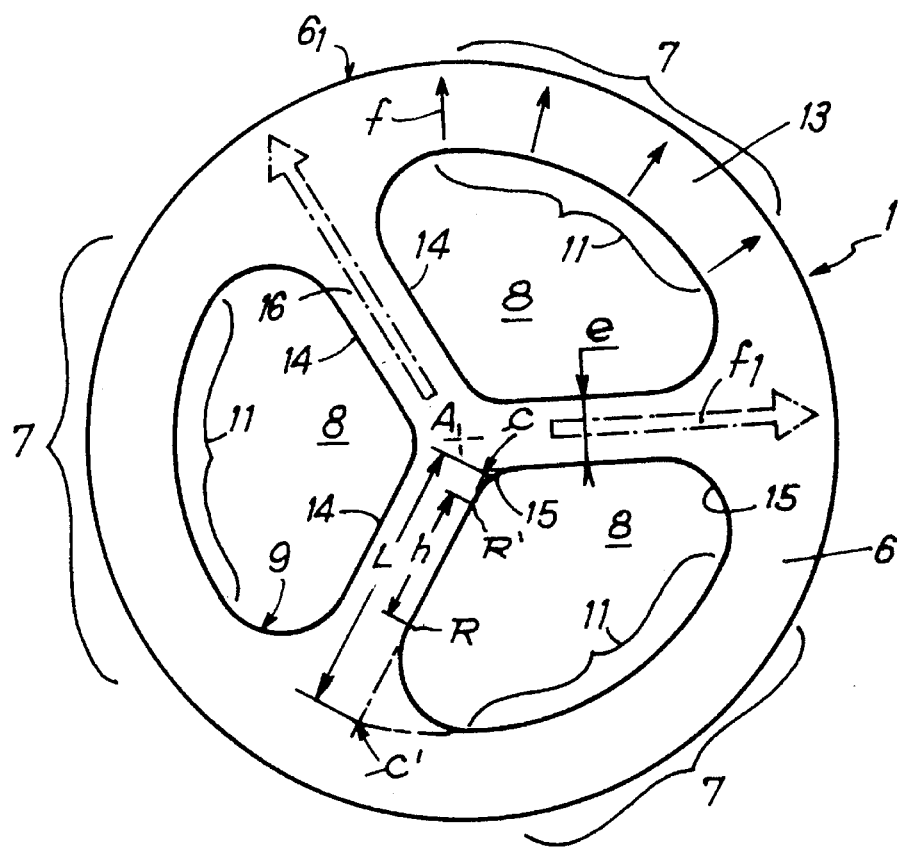
FIG. 2 is a cross-section through an embodiment of a multichannel filter element of the invention that has three channels.

As can be seen in FIG. 2, the inorganic filter element 1 of the invention is adapted to perform separation or filtration of molecules or particles contained in a fluid medium, preferably a liquid, and of various natures, including or not including a solid phase. The filter element 1 comprises a rigid inorganic porous support 6 made of a material whose resistance to transfer is adapted to the separation which is to be performed. The support 6 is made of inorganic material, e.g. metal oxides, carbon, or metals. In general, the support 6 is made to be elongate in shape constituting a duct extending along a longitudinal central axis A. The mean equivalent pore diameter of the porous support 6 lies in the range 2 µm to 12 µm, and is preferably about 5 µm. The right cross-section of the support 6 is hexagonal in shape, or as shown in FIG. 2, it is circular in shape. The support 2 thus provides an outside surface $6_1$ that is cylindrical or hexagonal.

The support 6 is organized to include at least two, and in the example shown in FIG. 2, three channels 8 extending parallel to the axis A of the support with their centers situated on a circle that is coaxial about the central axis A of the support. In this example, the porous support 6 possesses a diameter lying in the range 9 mm to 14 mm and that is preferably about 10 mm. Each of the channels 8 has a surface 9 that is covered in at least one separating layer (not shown) that is to come into contact with a fluid medium to be treated and that circulates inside the channels 8. The nature of the, or each, separating layer is chosen as a function of the separation or filtration power to be obtained, and it is intimately bonded with the support 6 so that pressure from the liquid medium is transmitted to the porous support. The, or each, layer may be deposited, for example, from a suspension containing at least one metal oxide and of the kind conventionally used for producing inorganic filter elements. After drying, said layer(s) is/are subjected to a sintering operation for consolidation purposes and for bonding the layers to one another, and to the porous support 6.

According to the invention, each channel 8 is organized in such a manner that a zone 11 of its surface 9, referred to as its curved or peripheral wall, is placed directly facing a fraction 7 of the outside surface $6_1$ of the support, thereby forming a filtrate-transferring passage 13 that is used solely by filtrate coming from said zone 11 of the corresponding channel. All of the channels 8 made in this way thus define a respective passage 13 between their own peripheral walls 11 and corresponding fractions 7 of the outside surface $6_1$ of the support, with said passages conveying solely fluid that comes from each of the corresponding zones 11, following paths as represented by arrows f. As can be seen in FIG. 2, the filtrate recovered through each of the zones 7 comes solely from fluid that has passed through the porous support 6 from the peripheral walls 11 in the surfaces of the channels 8.

Figure 1:
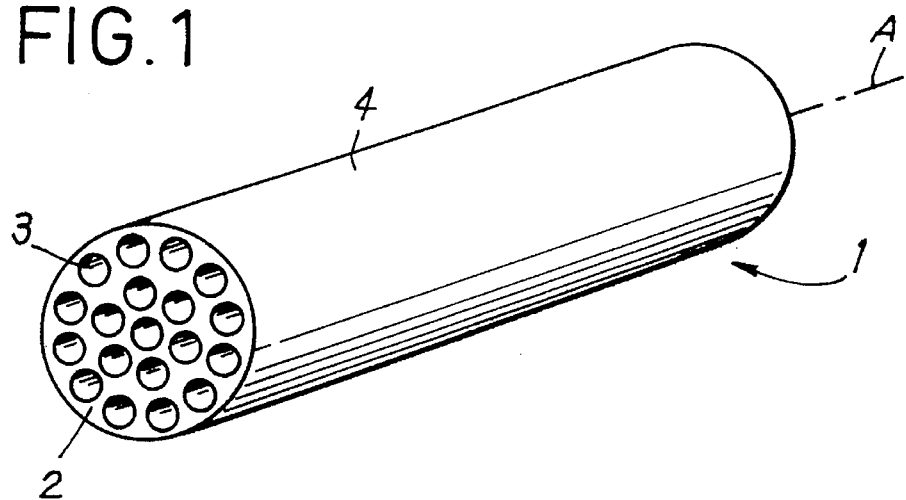
FIG. 1 is a general view of a prior art multichannel filter element.

According to the invention, there are no intermediate channels between the axis A of the support and the outside surface 7 of the support, unlike the prior art multichannel element shown in FIG. 1 in which channels in a central region do not have their own direct passages for filtrate coming solely from each of said channels. The filtrate coming from each channel in the central region combines with the filtrate from the peripheral channels prior to reaching the outside surface 7 of the support. Insofar as all of the channels 8 of the element of the invention have their own direct transfer passage to the outside surface, head loss in filtrate transfer is considerably reduced compared with prior technical solutions.

In the variant shown in FIG. 2, all of the channels 8 are of identical right cross-section, and each channel 8 possesses a curved wall 11 that is concentric with the outside surface 7 of the support. According to an advantageous characteristic of the invention, each passage 13 defined by a curved wall is of substantially constant thickness over the entire length of the zones 7 and 11. Advantageously, all of the passages 13 are of substantially identical thickness.

From the above description, the passages 13 serve to transfer fluid that passes through the porous support 6 from the peripheral walls 11 of the channels 8. It should be observed that fluid transfer as represented by arrows $f_1$ also takes place from the remaining surface area of the channels 8, i.e. from the radial walls 14 thereof, such that some filtrate passes through the pores in the support that remains between the channels 8. Each channel 8 has at least one, and in the example shown in FIG. 2, two radial walls 14 that are connected to each other and also to the peripheral wall 11 via connection fillets 15. Together with the radial wall of an adjacent channel facing it, each radial wall 14 defines a partition 16 that, according to a characteristic of the invention, is of constant thickness. Providing partitions 16 of constant thickness makes it possible to obtain deposits of regular thickness for the separating layers over the entire height h of the partitions. To avoid ambiguity, it should be understood that the height h of a partition 16 or of a radial wall 14 is the distance between the points R and R' where the fillets 15 join the straight portion constituting the radial wall 14 (FIG. 2). Consequently, the radial wall 14 does not include the two rounded portions 15 at either end thereof. The radial wall 14 corresponds to the straight portion taken between the two points of connection R and R' with the rounded portions 15, and the constant thickness e of the partition can be measured at any position between these two limits R and R'.

According to a characteristic of the invention, the ratio of the height h divided by the thickness e of a partition 16 is not greater than 8, and is preferably not greater than 6. It should be observed that when making a porous support of small diameter with rounded portions of large radius, the height h of the straight portion can be small, such that the ratio h/e is small. For example, the lowest value for the ratio h/e is about 0.5. The radial walls 14 participate in transferring the filtrate which takes place through the pores of the support as it exists between the channels 8. For a given thickness of radial partition, the flow rate through its pores is equal to the product of the permeability of the layers deposited on the walls multiplied by the area of the walls and by the driving force. Thus, for given permeability and pressure, the flow rate depends on the area, and thus on the height of the walls. Since the pores of the radial walls 14 are characterized by a permeability value, the pressure inside said walls depends on:

the value of said permeability;

the flow rate passing through the layers; and the section of the radial wall.

By way of example, for a pressure at the outlet from the radial wall of about 0.3 bars, which corresponds to a significant head loss, since said pressure opposes the driving force, it should be observed that the ratio h/e is equal to 8 for a partition having a thickness of 1 mm. A value of 8 for the ratio h/e thus corresponds to a maximum value beneath which the filter element operates well. Insofar as firstly all the channels 8 of the element of the invention have direct transfer passages with the outside surface, and secondly the radial partitions are of height h and of thickness e, such that the ratio h/e≦8, it is possible to obtain permeability that is very close to the permeability that corresponds, in the example shown, to three tubular elements having the same inside diameter as each of the channels. Thus, for each partition 16, the height h lies in the range 1 mm to 5 mm while the thickness e lies in the range 0.4 mm to 2.5 mm. To comply with this definition, each radial partition 16 has the same height h. By way of example, the porous support may be provided with an outside diameter of 10 mm (FIG. 2) so that the height h of each radial wall 14 is equal to 1.8 mm, while the thickness of each partition 16 is 1 mm, so as to obtain a ratio equal to 1.8.

According to another characteristic of the invention, the walls 11 and 14 of the channels are connected to one another via connection fillets 15 each having a radius lying in the range 0.3 mm to 1.5 mm. By providing such rounded connections, it is possible to conserve uniform deposition of the separating layers. The connection fillets 15 between a radial wall 14 and a peripheral wall 11 preferably, but not exclusively, have a radius lying in the range 0.5 mm to 1.5 mm, while the connection fillets 15 between pairs of radial walls 14 have a radius lying in the range 0.3 mm to 0.7 mm.

According to another preferred characteristic of the invention, the height h of the radial wall 14 is not less than half the theoretical height L of a radial side of a channel 8, i.e. h≧L/2. A radial side of a channel 8 includes, not only the radial wall 14, but also the rounded connection fillets 15. More precisely, the theoretical height L of a radial side of a channel is the distance between an inner reference C and an outer reference C'. The inner reference C, for a given channel 8, corresponds to the intersection beyond a connection fillet 15 between one radial wall 14 and the other radial wall, as extended beyond the connection fillet. For the same channel 8, the outer reference C' corresponds to the intersection between the circle defining the curved wall 11 of the channel and said radial wall, as extended.

According to another advantageous characteristic of the invention, and with reference to FIG. 2, in right cross-section, the channels 8 together present a total perimeter lying in the range 9 mm to 15 mm, and preferably being about 12.5 mm, and they preferably have a total surface area lying in the range 8 mm$^2$ to 15 mm$^2$, and preferably equal to about 11.4 mm$^2$. The filter element of the invention thus has a hydraulic diameter lying in the range 2.13 mm to 6.6 mm and preferably equal to about 3.6 mm.

Figure 3:
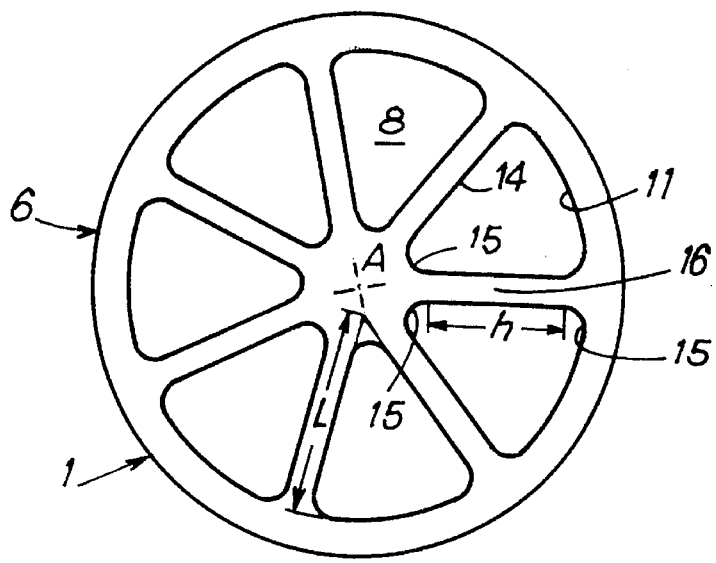
FIG. 3 is a view analogous to FIG. 2 showing a filter element that has seven channels.

In the above example, the filter element has three channels 8. Clearly the invention can be implemented using a filter element that has some other number of channels. By way of example, FIG. 3 shows a filter element 1 that has seven channels 8. This filter element satisfies the characteristics of the invention, i.e. its partitions 16 are of constant thickness over their entire height h, and the ratio of the height divided by the thickness e is not greater than 8, while the connection fillets 15 between the walls satisfy the values given above. Such a disposition makes it possible to obtain an element in which the deposited separating layers are free from defects, and the sizes of the partitions are suitable for ensuring good evacuation of the filtrate. Thus, for each partition 16, the height h lies in the range 4 mm to 9 mm and the thickness e lies in the range 0.7 mm to 2.5 mm. By way of example, the height h of each radial wall is equal to 6.1 mm while the thickness e of each radial wall is equal to 1.4 mm such that the ratio h/e is equal to 4.35.

In this embodiment, in right cross-section, the channels 8 together present a total perimeter lying in the range 23 mm to 30 mm, which perimeter is preferably equal to about 28.3 mm, and they have a total surface area lying in the range 36 mm$^2$ to 53 mm$^2$, and that is preferably equal to about 51.5 mm$^2$. The filter element of the invention thus has a hydraulic diameter lying in the range 4.8 mm to 9.3 mm and preferably equal to 6.06 mm. In this embodiment, the porous support 6 has a diameter lying in the range 20 mm to 26 mm, and preferably equal to 25 mm.

Figure 4:
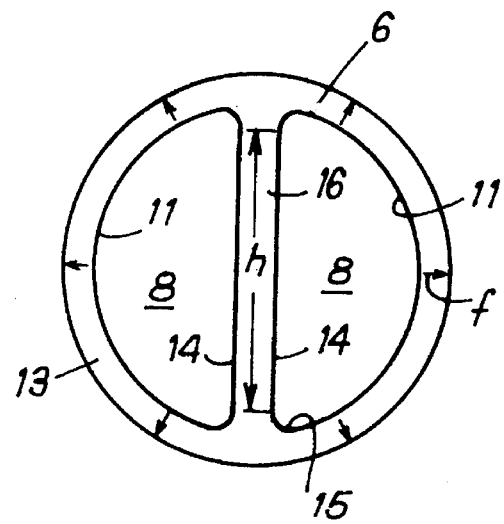
FIGS. 4 and 5 are cross-section views through two other variant embodiments of a filter element of the invention.

Naturally, a filter element 1 could be envisaged having channels 8 with a right cross-section whose profile is different, e.g. polygonal or pseudo-semicircular. Thus, as can be seen in FIG. 4, the filter element has two channels 8 placed side by side about a diameter of the support 6. Each channel 8 has at least one curved wall 11 placed directly facing a fraction of the outside surface 7 of the support so as to form a passage 13 through which filtrate is conveyed that comes exclusively from the corresponding surface of the channel. Each channel 8 leaves a central partition 16 of constant thickness bridging the ends of its radial wall 14. For each channel 8, the curved wall 11 is connected to the radial wall 14 via two connection fillets 15. Naturally, the support and the channels 8 are made so as to satisfy the criteria given with reference to FIG. 2. Thus, for example, the length h of the radial wall is 8.5 mm while the thickness of the radial wall is 1.21 mm so as to give a ratio h/e equal to 8. The diameter of the porous support 6 is 10 mm.

Figure 5:
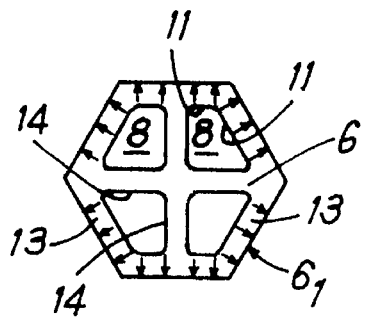

FIG. 5 shows another variant embodiment in which the filter element 1 is of polygonal right cross-section, of the hexagonal type. The support 6 is designed to have four channels 8, each of which possesses two peripheral walls 11 each co-operating with the outside surface 6₁ to define a passage 13 of constant thickness through which the filtrate flows. Each channel 8 also includes two radial walls 14. For example, the length of a side of the hexagonal may be 20 mm, while the height h of the radial walls is 12 mm and the thickness of the radial walls is 4 mm.

Naturally, the filter elements 1 of the invention can be associated with one another to make up modules implemented using conventional techniques.

We claim:

1. An inorganic element for filtering a fluid medium, for the purpose of recovering a filtrate, the element being of the type comprising:

a rigid inorganic porous support of cylindrical shape having a longitudinal central axis; and channels formed in the support, parallel to its central axis, and having centers situated on a circle that is coaxial about the central axis, each channel presenting:

a surface that is covered in at least one separating layer designed to come into contact with the fluid medium; and firstly at least one peripheral wall facing the outside surface of the support and co-operating therewith to define a passage of constant thickness through which the filtrate passes, and secondly, at least one radial wall co-operating with the facing radial wall of an adjacent channel to define a partition, the walls of the channel being connected to one another via connection fillets;

wherein:

each radial partition is of constant thickness over its entire height, with a ratio of the height of a partition divided by its thickness being not less than 8; and the connection fillets have a radius lying in the range 0.3 mm to 1.5 mm.

2. An element according to claim 1, comprising:

a porous support having a diameter lying in the range 9 mm to 14 mm;

three channels; and for each partition, a height lying in the range 1 mm to 5 mm, and a thickness lying in the range 0.4 mm to 2.5 mm.

3. An element according to claim 1, comprising:

a porous support having a diameter lying in the range 20 mm to 26 mm;

seven channels; and for each partition, a height lying in the range 4 mm to 9 mm, and a thickness lying in the range 0.75 mm to 2.5 mm.

4. An element according to claim 1, wherein the channels together present a total perimeter lying in the range 9 mm to 15 mm, and in right cross-section, a total surface area lying in the range 8 mm$^2$ to 15 mm$^2$.

5. An element according to claim 3, wherein the channels together present a total perimeter lying in the range 23 mm to 30 mm, and in right cross-section, a total surface area lying in the range 36 mm$^2$ to 53 mm$^2$.

6. An element according to claim 1, wherein the connection fillets between a radial wall and a peripheral wall have a radius lying in the range 0.5 mm to 1.5 mm, whereas the connection fillets between two radial walls have a radius lying in the range 0.3 mm to 0.7 mm.

7. An element according to claim 1, wherein the passages for conveying filtrate are of constant thickness that is identical for all of the channels.

8. An element according to claim 1, wherein the height of a radial wall is not less than half the theoretical height of a radial side of a channel.

9. A fluid filter module including a series of inorganic filter elements according to claim 1.

* * * * *